(12) United States Patent
Ma et al.

(10) Patent No.: US 7,035,178 B2
(45) Date of Patent: Apr. 25, 2006

(54) APPARATUS AND METHOD FOR GENERATING TRACKING ERROR SIGNAL

(75) Inventors: Byung-in Ma, Gyeonggi-do (KR);
Young-man Ahn, Gyeonggi-do (KR);
In-sik Park, Gyeonggi-do (KR);
Kwan-joon Kim, Gyeonggi-do (KR);
Byoung-ho Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 10/337,361

(22) Filed: Jan. 7, 2003

(65) Prior Publication Data

US 2003/0210622 A1    Nov. 13, 2003

(30) Foreign Application Priority Data

May 11, 2002    (KR) ............................... 2002-26030

(51) Int. Cl.
*G11B 7/00* (2006.01)
(52) U.S. Cl. .................................. 369/44.35
(58) Field of Classification Search ............. 369/44.35, 369/44.36, 44.41
See application file for complete search history.

(56) References Cited

U.S. PATENT DOCUMENTS

| | | | | |
|---|---|---|---|---|
| 5,235,584 A | * | 8/1993 | Yoshio et al. | 369/44.29 |
| 5,412,630 A | * | 5/1995 | Deguchi et al. | 369/44.32 |
| 5,905,703 A | * | 5/1999 | Osada | 369/44.41 |
| 6,134,198 A | * | 10/2000 | Yamamoto et al. | 369/44.35 |
| 6,614,745 B1 | * | 9/2003 | Takeda et al. | 369/124.13 |

\* cited by examiner

*Primary Examiner*—A. L. Wellington
*Assistant Examiner*—Lixi Chow
(74) *Attorney, Agent, or Firm*—Stein, McEwen & Bui, LLP

(57) ABSTRACT

An apparatus for and a method of producing a push-pull tracking error signal in an optical disc system having four light-receiving sections A, B, C, and D arranged in a radial direction of the optical disc. Pairs of signals $P_A$, $P_B$, $P_C$ and $P_D$, corresponding to light receiving sections A, B, C and D, respectively are differentially combined to provide differential signals. One differential signal is filtered, amplified and differentially combined with another differential signal to output a tracking error signal. Accordingly, distortion of the tracking error signal during jumping to a desired track and distortion of the tracking error signal due to a defect of the optical disc are prevented.

6 Claims, 7 Drawing Sheets

APPARATUS AND METHOD FOR GENERATING TRACKING ERROR SIGNAL

CROSS-REFERENCE TO RELATED APPLICATIONS

This application claims the benefit of Korean Patent Application No. 2002-26030, filed May 11, 2002, in the Korean Intellectual Property Office, the disclosure of which is incorporated herein by reference.

BACKGROUND OF THE INVENTION

1. Field of the Invention

The present invention relates to generating a tracking error signal in an optical disc system, and more particularly, to an apparatus and a push-pull method for producing the tracking error signal in an optical disc system that includes a multi-divisional photo detector, wherein a signal output from the multi-divisional photo detector is filtered in order to prevent deterioration of the tracking error signal.

2. Description of the Related Art

A push-pull method utilizing a multi-divisional photo detector is extensively used as a tracking method for controlling an optical spot to be condensed on a recording surface of an optical disc and required to follow a track of the optical disc in an optical disc system.

A method of producing a tracking error signal with a conventional push-pull method using a four-divisional photo detector will now be described with reference to FIGS. 1 through 3.

FIG. 1 is a diagram of a pickup of a general optical disc system, the pickup including an objective lens 13, a polarized prism 15, and a light detecting means 17.

A laser beam output from a light source (not shown) passes through the objective lens 13 and is concentrated on a recording section of the optical disc 11. Also, the laser beam is reflected from the polarized prism 15 to be incident on the light detecting means 17.

FIG. 2 is a diagram of a four-divisional photo detector useable as the light detecting means 17 of FIG. 1. The light-receiving surface of the photo detector is divided into four sections A through D in a radial direction. The photo detector receives the laser beam that is reflected from the optical disc 11 and incident upon the light detecting means 17, and detects and outputs the intensity of the received laser beam per section.

FIG. 3 is a block diagram of a conventional apparatus for producing a tracking error signal by a push-pull method using the four-divisional photo detector shown in FIG. 2. The apparatus shown in FIG. 3 comprises first through third operation units 31, 33, and 37, and an amplifier 35. Referring to FIGS. 2 and 3, the first operation unit 31 performs an operation of $(P_B-P_C)$ where $P_B$ indicates an intensity of a beam received by the light-receiving section B and $P_C$ indicates an intensity of a beam received by the light-receiving section C. The second operation unit 33 performs an operation of $(P_A-P_D)$ where $P_A$ indicates an intensity of a beam received by the light-receiving section A and $P_D$ indicates an intensity of a beam received by the light-receiving section D. The amplifier 35 amplifies a signal output from the first operation unit 31 k times. The third operation unit 37 performs an operation of (R1−kR2) in order to output an output signal R3, where R1 is a signal output from the second operation unit 33 and R2 is a signal output from the amplifier 35. As a result, R3=$(P_A-P_D)$−k$(P_B-P_C)$. The signal R1 obtained as $(P_A-P_D)$ may contain a track cross component and a shift component of the objective lens and the signal R2 obtained as $(P_B-P_C)$ may contain a small track cross component and a large shift component of the objective lens. Thus, under such conditions, if the signal R2 is multiplied by k, which is a regular gain, and subtracted from the signal R1, the track cross component remains approximately as before, but the shift component of the objective lens is removed, thereby finally obtaining the tracking error signal.

However, the apparatus of FIG. 3 is disadvantageous in that the overall output signal depends on the division ratio of the photo detector or a track pitch of an optical disc. For instance, if the widths of the light-receiving sections B and C are larger than those of the light-receiving sections A and B, the track cross component is output, as well as the shift component of an objective lens, when a laser beam crosses a track. In this case, the phase of a track cross component in the signal R1 is the same as that of a track cross component in the signal R2, and therefore, a track cross component in the output signal R3 of a tracking error signal decreases, thus resulting in deterioration of the characteristics of the tracking error signal.

Also, the signal R2 is used only to detect the shift component of an objective lens and has a lower frequency than the signal R1. If the signal R2 has a higher frequency component than the shift component of the objective lens, the higher frequency component will work as noise when calculating a tracking error signal.

In the event that an optical disc includes a defect, the defect affects the light-receiving sections B and C more than the light-receiving sections A and B. Thus, the signal R2 has noise in a light-receiving section having a defect, thereby deteriorating the tracking error signal.

SUMMARY OF THE INVENTION

To solve the above problem, it is an object of the present invention to provide an apparatus for producing a tracking error signal, wherein the apparatus filters a signal output from a multi-divisional photo detector in order to prevent deterioration of a tracking error signal.

It is a another object of the present invention to provide a method of producing a tracking error signal, wherein a signal corresponding to light intensity reflected from an optical disc is filtered to prevent deterioration of a tracking error signal.

Additional objects and advantages of the invention will be set forth in part in the description which follows, and, in part, will be obvious from the description, or may be learned by practice of the invention.

To achieve above and/or other objects of the invention, there is provided an apparatus for producing a tracking error signal in an optical disc system that includes a photo detector having four light-receiving sections A, B, C, and D in a radial direction and produces the tracking error signal using a push-pull method. The apparatus comprises a first operation unit which receives a signal $P_B$ and a signal $P_C$ and performs a differential operation on the signals $P_B$ and $P_C$ to output a signal $(P_B-P_C)$, the signals $P_B$ and $P_C$ corresponding to respective light intensities of light received at the light-receiving sections B and C; a second operation unit which receives a signal $P_A$ and a signal $P_D$ and performs a differential operation on the signals $P_A$ and $P_D$ to output a signal $(P_A-P_D)$, the signals $P_A$ and $P_D$ corresponding to respective light intensities received at the light-receiving sections A and D; a first low-pass filter having a predetermined first bandwidth and which filters the signal $(P_B-P_C)$; an amplifier which amplifies the low-pass filtered signal ($P_B$–$P_C$); and a third operation unit which performs a differential operation on signals S1 and S2 to output the tracking error signal (S1–S2), where S1 is the signal ($P_A$–$P_D$) and S2 is the filtered and amplified signal ($P_B$–$P_C$).

The apparatus may further comprise a second low-pass filter that has a predetermined second bandwidth and receives and filters the signal ($P_A$–$P_D$).

The first bandwidth may be predetermined to remove a track cross signal contained in the signal ($P_B$–$P_C$), and the second bandwidth may be determined to be larger than the first bandwidth.

To achieve the above and other objects of the present invention, there also is provided a method of producing a tracking error signal in an optical disc system by a push-pull method, the optical disc system using a photo detector having four light-receiving sections A, B, C, and D in a radial direction. The method comprises performing a first differential operation on signals $P_B$ and $P_C$ and outputting a signal ($P_B$–$P_C$), the signals $P_B$ and $P_C$ corresponding to respective light intensities received at the light-receiving sections B and C; performing a second differential operation on signals $P_A$ and $P_D$ and outputting a signal ($P_A$–$P_D$), the signals PA and PD corresponding to respective light intensities at the light-receiving sections A and D; filtering the signal ($P_B$–$P_C$) at a predetermined first bandwidth; amplifying the filtered signal ($P_B$–$P_C$); and performing a third differential operation on signals S1 and S2 to output the tracking error signal (S1–S2), where S1 is the signal ($P_A$–$P_D$) and S2 is the filtered and amplified signal ($P_B$–$P_C$).

The method may further comprise filtering the signal ($P_A$–$P_D$) at a predetermined second bandwidth.

Also, the predetermined second bandwidth is determined to be larger than the first predetermined bandwidth.

BRIEF DESCRIPTION OF THE DRAWINGS

The above and/or other objects and advantages of the present invention will become more apparent by describing in detail preferred embodiments thereof with reference to the attached drawings in which.

DESCRIPTION OF THE PREFERRED EMBODIMENTS

Figure 1:
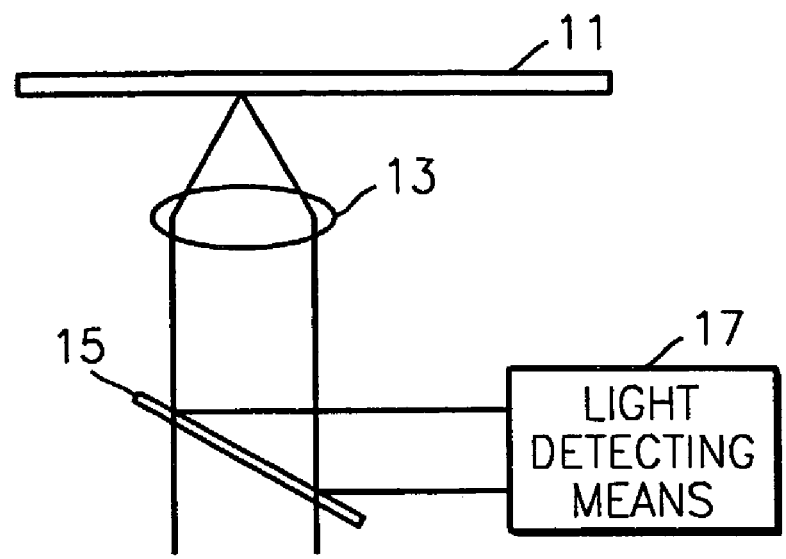
FIG. 1 is a diagram of a pickup in a conventional optical disc system.

Reference will now be made in detail to the present embodiments of the present invention, examples of which are illustrated in the accompanying drawings, wherein like reference numerals refer to like elements throughout.

Figure 2:
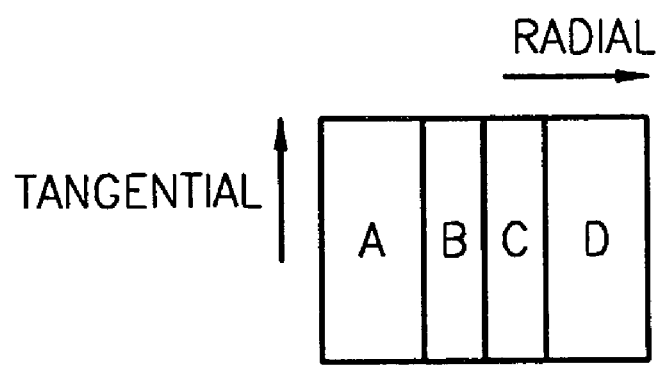
FIG. 2 is a diagram of a conventional four-division photo detector.
Figure 4:
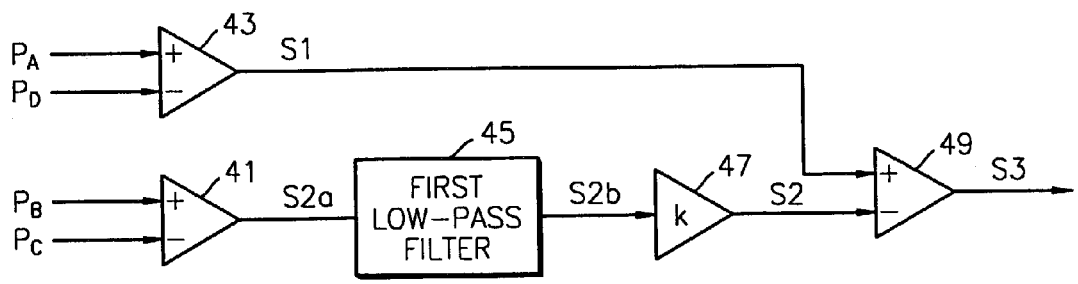
FIG. 4 is a block diagram illustrating a first embodiment of an apparatus for producing a tracking error signal according to the present invention.
Figure 5:
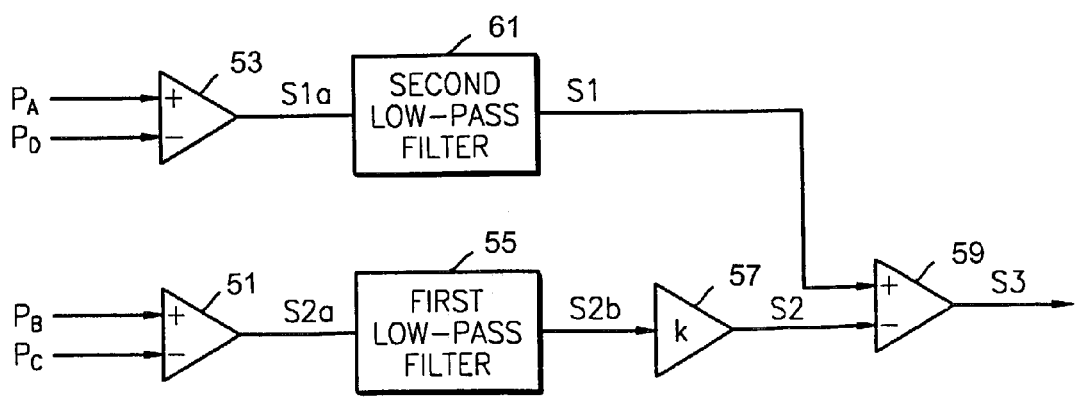
FIG. 5 is a block diagram illustrating a second embodiment of an apparatus for producing a tracking error signal according to the present invention.

FIGS. 4 and 5 are block diagrams of first and second embodiments, respectively, of an apparatus for producing a tracking error signal according to the present invention. In the foregoing descriptions, intensities of light output from the light-receiving sections A, B, C, and D of the four-division photo detector of FIG. 2 are represented as $P_A$, $P_B$, $P_C$, and $P_D$, respectively.

Referring now to FIG. 4, a first operation unit 41 performs an operation ($P_B$–$P_C$) and outputs a signal S2a. A second operation unit 43 performs an operation ($P_A$–$P_D$) and outputs a signal S1.

A first low-pass filter 45 receives the signal S2a, which is obtained through the operation ($P_B$–$P_C$), from the first operation unit 41, low-pass filters the signal S2a; and outputs a signal S2b. The bandwidth of the first low-pass filter 45 is set to an appropriate value BW1 such that a track cross component contained in the signal S2a and noise due to defects present in an optical disc are removed and a shift component of an objective lens is passed.

An amplifier 47 amplifies the signal S2b output from the first low-pass filter 45 by a factor k and outputs a signal S2. A third operation unit 49 performs an operation of (S1–S2) on the signal S1 output from the second operation unit 43 and the signal S2 output from the amplifier 47 to produce the tracking error signal S3.

FIG. 5 is a block diagram of a second embodiment of an apparatus for producing a tracking error signal according to the present invention. Referring now to FIG. 5, a first operation unit 51 performs an operation ($P_B$–$P_C$) and outputs a signal S2a. A second operation unit 53 performs an operation ($P_A$–$P_D$) and outputs a signal S1a.

A first low-pass filter 55 receives the signal S2a, low-pass filters the signal S2a, and outputs a signal S2b. The bandwidth of the first low-pass filter 55 is set to an appropriate value BW1 such that a track cross component contained in the signal S2a and noise due to defects present in an optical disc are removed and a shift component of an objective lens is passed.

The signal S1 a output from the second operation unit 53 and obtained by the operation ($P_A$–$P_D$), is input to a second low-pass filter 61 having a bandwidth BW2. The bandwidth BW2 of the second low-pass filter 50 is set to be larger than the bandwidth BW1 of the first low-pass filter 55, so that the bandwidth BW2 may be broadly determined within a certain range without interfering with the tracking control for a laser beam to follow a desired track of an optical disc, while removing noise having a larger frequency than the bandwidth BW2. A signal S1 is output from the second low pass filter 61.

An amplifier 57 amplifies the signal S2b output from the first low-pass filter 55 by a factor k and outputs a signal S2. A third operation unit 59 performs an operation of (S1–S2) on the signal S1 output from the second low pass filter 61 and the signal S2 output from the amplifier 47 to produce the tracking error signal S3.

Figure 6:
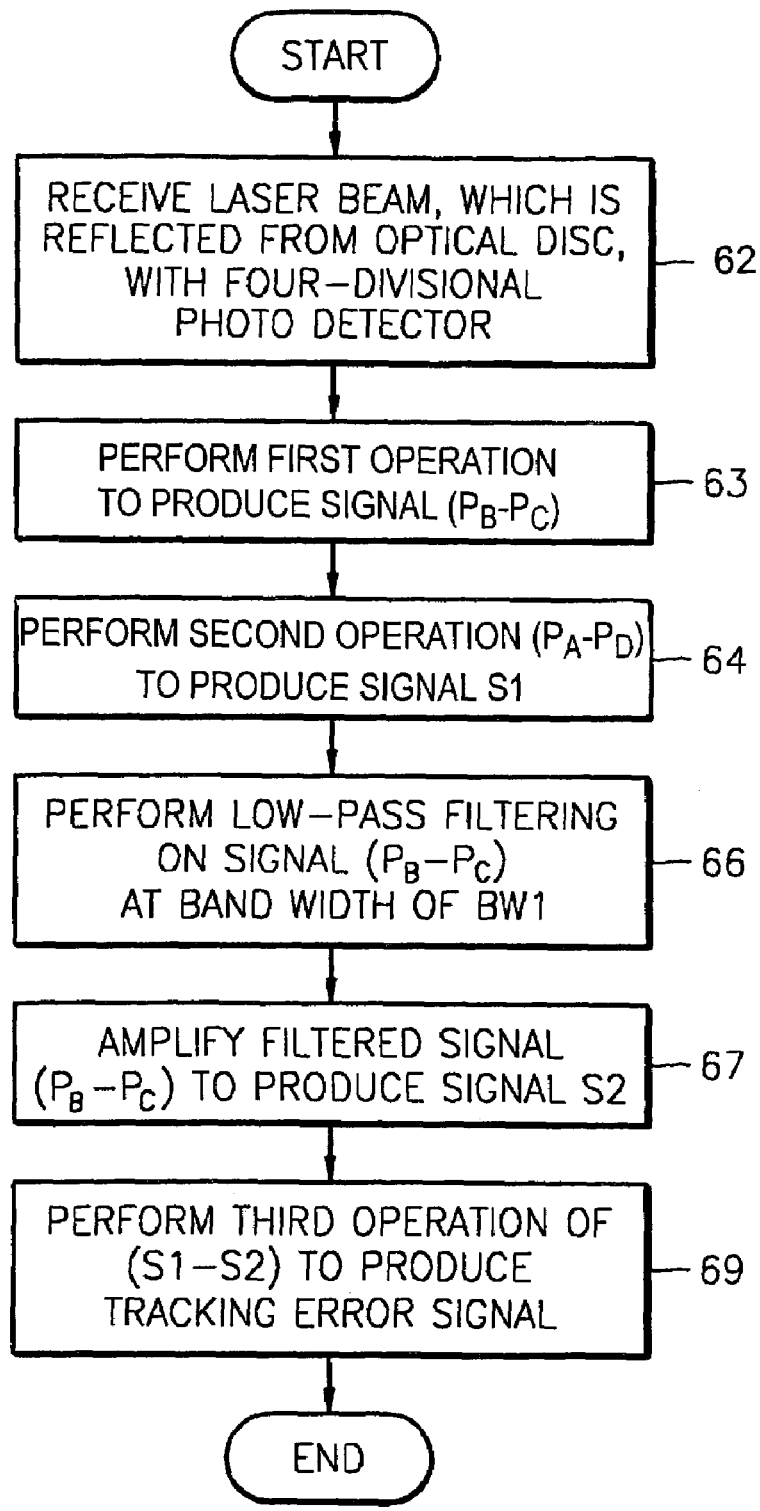
FIG. 6 is a flowchart illustrating a first embodiment of a method of producing a tracking error signal according to the present invention.

FIG. 6 is a flowchart illustrating a first embodiment of a method for producing a tracking error signal according to the present invention.

Referring now to FIG. 6, a laser beam reflected from an optical disc is received by a four-division photo detector having light receiving sections A, B, C and D, and signals $P_A$, $P_B$, $P_C$, and $P_D$ corresponding to light intensities from the light receiving sections A, B, C and D, respectively, are generated at operation 62.

A first differential operation of $(P_B–P_C)$ is performed at operation 63 to produce a signal $(P_B–P_C)$. A second differential operation of $(P_A–P_D)$ is performed at operation 64 to produce a signal S1. Alternatively, the operation 64 may be performed prior to or concurrently with the operation 63.

The signal $(P_B–P_C)$ is low-pass filtered at a bandwidth BW1 at operation 66. The bandwidth BW1 is set to an appropriate value so as to remove a track cross component contained in the signal $(P_B–P_C)$ and referred to as noise, and noise generated due to a defect in an optical disc, while passing a shift component of an objective lens.

The low-pass filtered $(P_B–P_C)$ is amplified by a factor k at operation 67 to produce a signal S2.

A third differential operation of (S1–S2) is performed at operation 69 to produce the tracking error signal.

Figure 7:
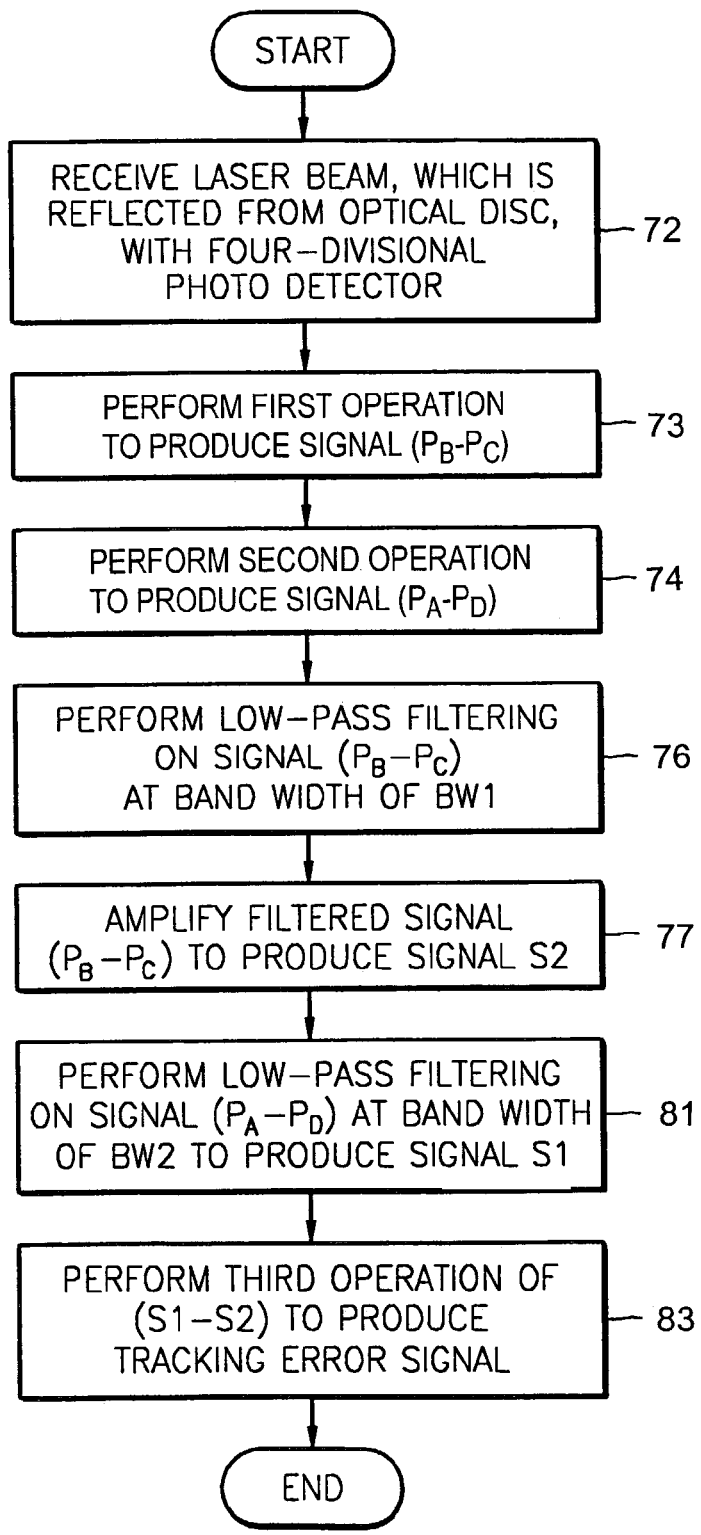
FIG. 7 is a flowchart illustrating a second embodiment of a method of producing a tracking error signal according to the present invention.

FIG. 7 is a flowchart illustrating a second embodiment of a method of producing a tracking error signal according to the present invention.

Referring now to FIG. 7, a laser beam reflected from an optical disc is received by a four-division photo detector having light receiving sections A, B, C and D, and signals $P_A$, $P_B$, $P_C$, and $P_D$ corresponding to light intensities from the light receiving sections A, B, C and D, respectively, are generated at operation 72.

A first differential operation of $(P_B–P_C)$ is performed at operation 73 to produce a signal $(P_B–P_C)$. A second differential operation of $(P_A–P_D)$ is performed at operation 74 to produce a signal $(P_A–P_D)$ at operation 74. Alternatively, the operation 74 may be performed prior to or concurrently with the operation 73.

The signal $(P_B–P_C)$ is low-pass filtered at a bandwidth BW1 at operation 76. The bandwidth BW1 is set to an appropriate value so as to remove a track cross component contained in the signal $(P_B–P_C)$ and referred to as noise, and noise generated due to a defect in an optical disc, while passing a shift component of an objective lens. The low-pass filtered $(P_B–P_C)$ is amplified by a factor k at operation 77 to produce a signal S2.

At operation 81, the signal $(P_A–P_D)$ is low pass filtered with a bandwidth BW2 to produce a signal S1. The bandwidth BW2 of the second low-pass filter 50 is set to a value larger than the bandwidth BW1 so that the bandwidth BW2 can be broadly determined within a certain range without interfering with tracking control for a laser beam to follow a desired track of an optical disc while removing noise having a larger frequency than the bandwidth BW2.

A third differential operation of (S1–S2) is performed at operation 83 to produce the tracking error signal.

FIGS. 8A through 10B illustrate comparative experimental results when producing a tracking error signal by using a conventional optical disc system and using the apparatus according to the first embodiment of the present invention shown in FIG. 4. All experiments are performed with an optical disc system in which a wavelength of the laser beam is 405 nm, the objective lens has a numerical aperture of 0.85, and the track pitch of a land-groove structure is 0.32 μm.

Figure 3:
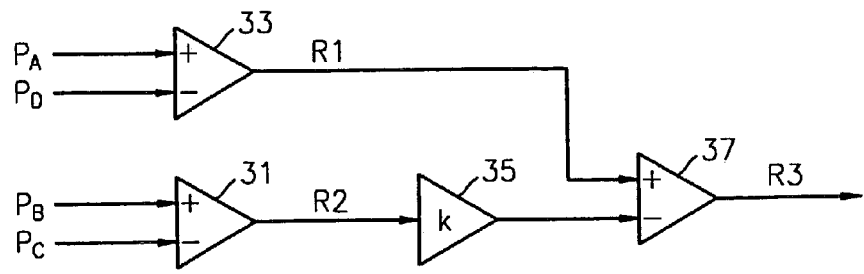
FIG. 3 is a block diagram of an apparatus for producing a tracking error signal by a push-pull method using the conventional four-divisional photo detector of FIG. 2.
Figure 8A:
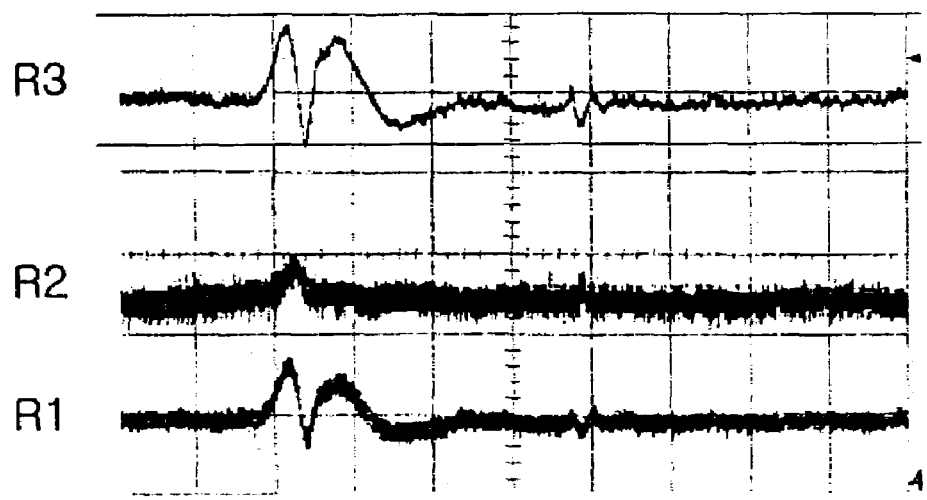
FIG. 8A shows waveform diagrams obtained from the apparatus shown in FIG. 3 during a track cross condition.

More specifically, FIG. 8A illustrates waveform diagrams of signals R1 and R2 and a tracking error signal R3 which is a finally obtained output signal, when jumping to a certain track while producing the track error signal with the conventional tracking error signal producing apparatus of FIG. 3, where R1, R2 and R3 are obtained as indicated in FIG. 3. Here, R1 denotes the waveform of a signal obtained by an operation of $(P_A–P_D)$, R2 denotes the waveform of a signal obtained by an operation of $(P_B–P_C)$, and R3 denotes the waveform of a tracking error signal. From FIG. 8A, it is noted that the signal R2 contains a track cross component generated while jumping to a track, and the frequency of the signal R2 becomes higher when the track cross component is generated.

Figure 8B:
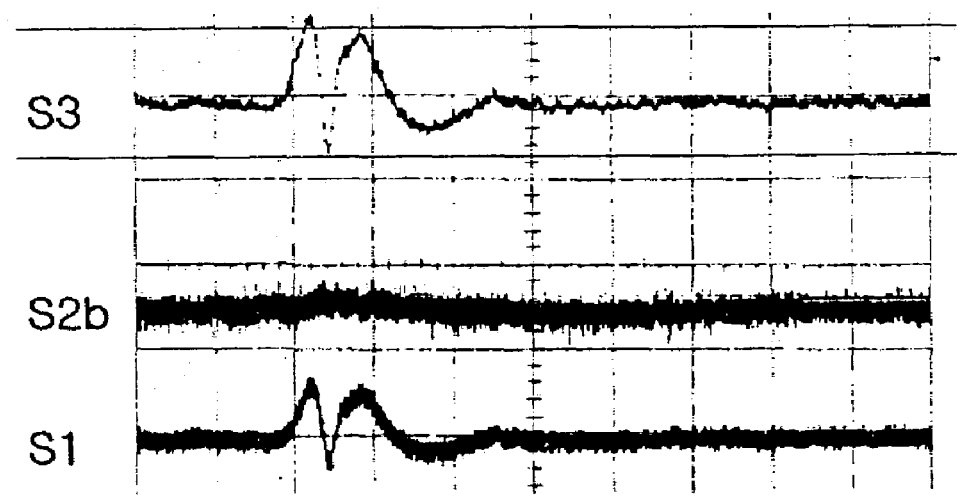
FIG. 8B shows waveform diagrams obtained from the apparatus shown in FIG. 4 during the track cross condition.

FIG. 8B illustrates waveform diagrams of signals S1 and S2b and a tracking error signal S3 obtained with the apparatus shown in FIG. 4 and under the same experimental conditions which provided the results shown in FIG. 8A. Referring to FIG. 8B, S1 denotes the same signal as the signal R1 of FIG. 8A, S2b denotes a signal that is the signal R2 of FIG. 8A filtered by the first low-pass filter 45 of FIG. 4, and S3 denotes a tracking error signal output from the third operation unit 49. As shown in FIG. 8B, the track cross component contained in the signal R2 is removed in the signal S2b, and thus, the amplitude of signal S3 is larger than the signal R3 of FIG. 8A.

Figure 9A:
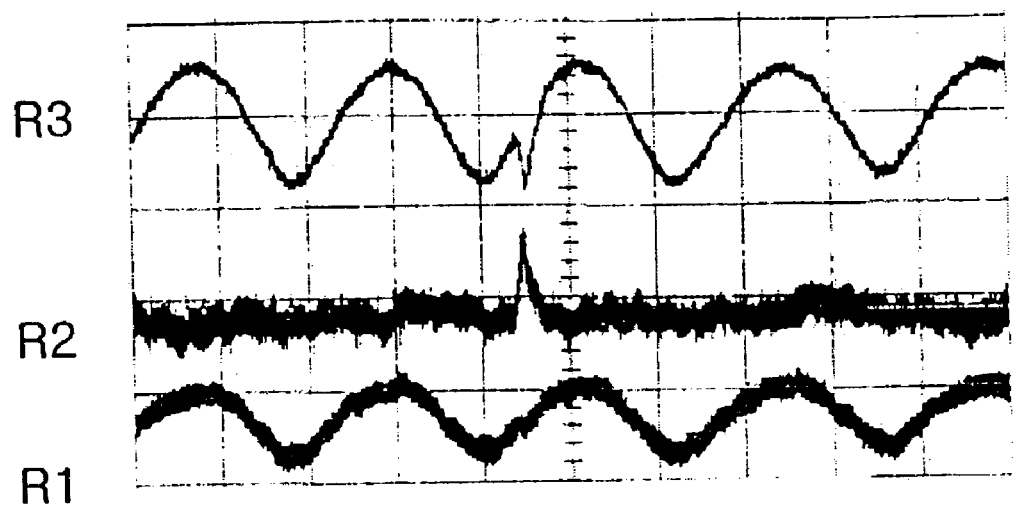
FIG. 9A shows waveform diagrams obtained from the apparatus shown in FIG. 3 where the disc includes a defect.

FIG. 9A illustrates waveform diagrams from the conventional system obtained where an optical disc used has a defect and a tracking control of the system is off. Referring to FIG. 9A, a signal R2 is distorted due to the defect of the optical disc, which results in a distortion of a signal R3.

Figure 9B:
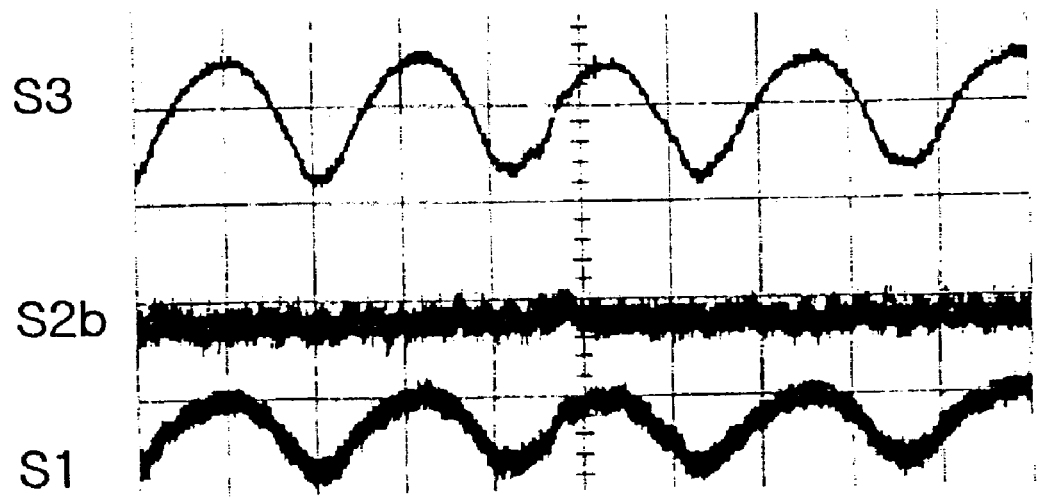
FIG. 9B shows waveform diagrams obtained from the apparatus shown in FIG. 4 where the disc includes the defect.

FIG. 9B illustrates waveform diagrams obtained by producing the tracking error signal with the apparatus of FIG. 4 where the optical disc used has the same defect as the disc used in the data shown in FIG. 9A and the tracking control of the system is also off. Referring to FIG. 9B, the distorted signal R2 of FIG. 9A is low-pass filtered and generated as a signal S2b from which the distorted portion is removed. Thus, the signal S3 has no distorted portion in comparison with the signal R3 of FIG. 9A.

Figure 10A:
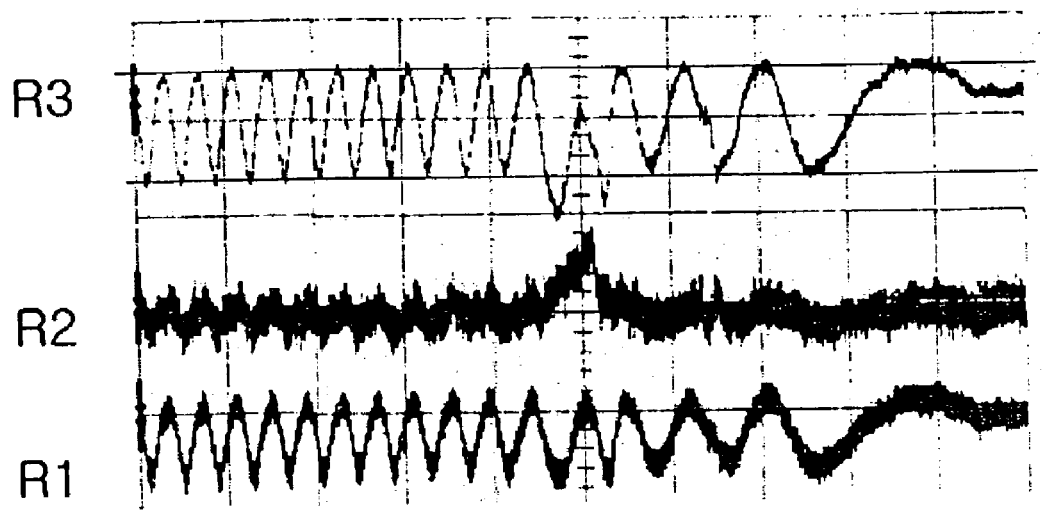
FIG. 10A shows waveform diagrams obtained from the apparatus shown in FIG. 3 where the disc includes a greater defect.

FIG. 10A illustrates the waveform diagrams of the conventional apparatus of FIG. 3, in a case where an optical disc used has a greater defect than the disc used to obtain the waveforms shown in FIG. 9A and where the tracking control is also off. Referring to FIG. 10A, signals R2 and R3 contain distorted portions.

Figure 10B:
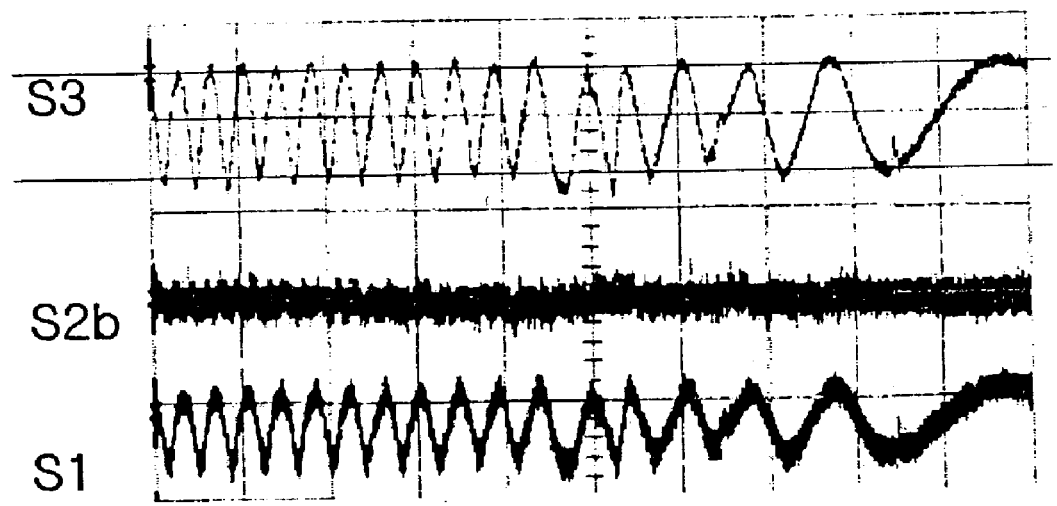
FIG. 10B shows waveform diagrams obtained from the apparatus shown in FIG. 4 where the disc includes the greater defect.

FIG. 10B illustrates the waveform diagrams when producing the tracking error signal with the apparatus of FIG. 4 where the optical disc used has the same defect as the disc used to obtain the waveform diagrams shown in FIG. 10A and the tracking control is also off. Referring to FIG. 10B, signals S2b and S3 contain no distorted portions.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for producing a push-pull tracking error signal in an optical disc system using a photo detector with four light-receiving sections A, B, C, and D arranged in a radial direction of the optical disc and producing signals $P_A$, $P_B$, $P_C$ and $P_D$, respectively, according to respective intensities of received light, the apparatus comprising:

a first operation unit which performs a differential operation on the signals $P_B$ and $P_C$ to output a signal $(P_B–P_C)$;

a second operation unit which performs a differential operation on the signals $P_A$ and $P_D$ to output a signal $(P_A–P_D)$;

a low-pass filter having a predetermined first bandwidth which filters the signal $(P_{B–PC})$;

a second low-pass filter having a predetermined second bandwidth which filters the signal $(P_A–P_D)$, the predetermined second bandwidth being larger than the predetermined first bandwidth;

an amplifier which amplifies the filtered signal $(P_B–P_C)$; and a third operation unit which performs a differential operation on the filtered signal $(P_A–P_D)$ and the amplified filtered signal $(P_B–P_C)$ to output the tracking error signal.

2. The apparatus of claim 1, wherein the first bandwidth is predetermined to remove a track cross signal contained in the signal $(P_B–P_C)$.

3. A method of producing a push-pull tracking error signal in an optical disc system using a photo detector having four light-receiving sections A, B, C, and D arranged in a radial direction of the optical disc and producing signals $P_A$, $P_B$, $P_C$ and $P_D$, respectively, according to respective intensities of received light, the method comprising:

performing a first differential operation on the signals $P_B$ and $P_C$ and outputting a signal $(P_B–P_C)$;

performing a second differential operation on the signals $P_A$ and $P_D$ and outputting a signal $(P_A–P_D)$;

low-pass filtering the differential signal $(P_B–P_C)$ with a predetermined first bandwidth;

low-pass filtering the signal $(P_A–P_D)$ with a predetermined second bandwidth, wherein the second bandwidth is larger than the first bandwidth;

amplifying the low-pass filtered differential signal $(P_B–P_C)$; and performing a third differential operation on the low pass filtered differential signal $(P_A–P_D)$ and the low-pass filtered differential signal $(P_B–P_C)$ to output the tracking error signal.

4. The method of claim 3, wherein the first bandwidth is predetermined to remove a track cross signal contained in the signal $(P_B–P_C)$.

5. A method of generating a tracking error signal in an optical disc system which generates a plurality of light receiving signals corresponding to light reflected from an optical disc, the method comprising:

obtaining a plurality of differential signals from pairs of the plurality of light receiving signals;

low pass filtering a first of the plurality of differential signals;

low pass filtering a second of the plurality of differential signals; and generating the tracking error signal by obtaining a differential signal from the first and second low pass filtered differential signals, wherein:

the second of the plurality of differential signals is filtered with a bandwidth greater than a bandwidth by which the first of the plurality of differential signals is filtered.

6. The method of claim 5, wherein the bandwidth by which the first of the plurality of differential signals is filtered is predetermined to remove a track cross signal contained in the first differential signal.

* * * * *